United States Patent
Wilding

(10) Patent No.: US 10,697,381 B2
(45) Date of Patent: Jun. 30, 2020

(54) METHOD FOR OPERATING A DRIVE DEVICE OF A MOTOR VEHICLE AND CORRESPONDING DRIVE DEVICE

(71) Applicant: AUDI AG, Ingolstadt (DE)

(72) Inventor: Werner Wilding, Walting (DE)

(73) Assignee: Audi AG, Ingolstadt (DE)

( * ) Notice: Subject to any disclaimer, the term of this patent is extended or adjusted under 35 U.S.C. 154(b) by 392 days.

(21) Appl. No.: 15/453,428

(22) Filed: Mar. 8, 2017

(65) Prior Publication Data

US 2018/0051641 A1    Feb. 22, 2018

(30) Foreign Application Priority Data

Mar. 26, 2016   (DE) .................. 10 2016 003 752

(51) Int. Cl.
| F02D 41/00 | (2006.01) |
| F02B 39/10 | (2006.01) |
| F02B 37/10 | (2006.01) |
| F02B 37/04 | (2006.01) |
| F02D 41/10 | (2006.01) |

(Continued)

(52) U.S. Cl.
CPC .......... *F02D 41/0007* (2013.01); *F02B 37/04* (2013.01); *F02B 37/10* (2013.01); *F02B 37/16* (2013.01); *F02B 39/10* (2013.01); *F02D 11/105* (2013.01); *F02D 41/10* (2013.01); *F02D 2200/1002* (2013.01); *F02D 2200/60* (2013.01); *F02D 2200/604* (2013.01); *F02D 2200/606* (2013.01); *F02D 2250/18* (2013.01); *Y02T 10/144* (2013.01)

(58) Field of Classification Search
CPC .... F02D 41/0007; F02D 11/105; F02B 39/10; F02B 2037/162; F02B 37/16; F02B 37/10; F02B 37/04
See application file for complete search history.

(56) References Cited

U.S. PATENT DOCUMENTS

| 4,756,377 A * | 7/1988 | Kawamura ............. B60K 6/22 180/165 |
| 5,255,638 A | 10/1993 | Sasaki et al. |
| 5,365,908 A | 11/1994 | Takii et al. |

(Continued)

FOREIGN PATENT DOCUMENTS

| CN | 101113602 | 1/2008 |
| DE | 103 92 696 | 5/2005 |

(Continued)

OTHER PUBLICATIONS

European Search Report dated Mar. 23, 2017 with respect to counterpart European patent application EP 16 20 0496.

(Continued)

*Primary Examiner* — Ngoc T Nguyen
(74) *Attorney, Agent, or Firm* — Henry M. Feiereisen LLC

(57) ABSTRACT

A method for operating a drive device of a motor vehicle is disclosed. The drive device has a compressor, which can be driven by an electric motor for supplying combustion fresh gas to an internal combustion engine of the motor vehicle. At a power increase of the internal combustion engine, the compressor is driven with the electric motor so that a torque curve selected from a plurality of different torque curves is established at the internal combustion engine over its rotational speed.

9 Claims, 2 Drawing Sheets

(51) Int. Cl.
  *F02D 11/10* (2006.01)
  *F02B 37/16* (2006.01)

(56) References Cited

U.S. PATENT DOCUMENTS

| | | | |
|---|---|---|---|
| 5,870,894 | A | 2/1999 | Woollenweber et al. |
| 6,079,211 | A * | 6/2000 | Woollenweber ...... F02B 37/025 60/602 |
| 9,200,578 | B2 | 12/2015 | Flohr |
| 9,381,934 | B2 | 7/2016 | Pfeiffer et al. |
| 9,452,725 | B2 | 9/2016 | Lorenz et al. |
| 2004/0194466 | A1* | 10/2004 | Kawamura ............ F02B 33/34 60/612 |
| 2008/0011278 | A1* | 1/2008 | Yamagata ............... F02D 23/00 123/562 |
| 2010/0287932 | A1 | 11/2010 | Tanaka et al. |
| 2013/0008161 | A1* | 1/2013 | Flohr ................... F02B 37/001 60/600 |
| 2013/0275023 | A1* | 10/2013 | Gregg ..................... F02D 28/00 701/102 |
| 2013/0282257 | A1* | 10/2013 | Panciroli ............ B60K 31/0058 701/102 |
| 2015/0361915 | A1 | 12/2015 | Sujan et al. |
| 2015/1361915 | | 12/2015 | Sujan et al. |
| 2016/0363043 | A1* | 12/2016 | Hirayama ............... F02B 33/40 |

FOREIGN PATENT DOCUMENTS

| | | |
|---|---|---|
| DE | 10 2004 014 102 | 10/2005 |
| DE | 10 2007 052 118 | 5/2009 |
| DE | 10 2015 205 559 | 9/2016 |
| EP | 0 791 735 | 8/1997 |
| EP | 2 696 052 | 2/2014 |
| JP | S60-169630 | 9/1985 |
| JP | H 04-27719 | 1/1992 |
| JP | 2002-234363 | 8/2002 |
| JP | 2004-169582 | 6/2004 |
| JP | 2008-19835 | 1/2008 |
| JP | 2008-019835 | 1/2008 |
| JP | 2010-127140 | 6/2010 |
| WO | WO 2004/003359 | 1/2004 |

OTHER PUBLICATIONS

Translation of European Search Report dated Mar. 23, 2017 with respect to counterpart European patent application EP 16 20 0496.
Chinese Search Report dated Sep. 3, 2019 with respect to counterpart Chinese patent application 2017100483689.
Translation of Chinese Search Report dated Sep. 3, 2019 with respect to counterpart Chinese patent application 2017100483689.

* cited by examiner

METHOD FOR OPERATING A DRIVE DEVICE OF A MOTOR VEHICLE AND CORRESPONDING DRIVE DEVICE

CROSS-REFERENCES TO RELATED APPLICATIONS

This application claims the priority of German Patent Application, Serial No. 10 2016 003 752.0, filed Mar. 26, 2016, pursuant to 35 U.S.C. 119(a)-(d), the content of which is incorporated herein by reference in its entirety as if fully set forth herein.

BACKGROUND OF THE INVENTION

The invention relates to a method for operating a drive device of a motor vehicle.

The following discussion of related art is provided to assist the reader in understanding the advantages of the invention, and is not to be construed as an admission that this related art is prior art to this invention.

The drive device serves for driving the motor vehicle, and thus for providing a torque that is directed towards driving the motor vehicle. For this purpose the drive device has at least one drive aggregate, i.e., the internal combustion engine. In addition to the internal combustion engine at least one further drive aggregate, in particular an electric machine or the like, can be provided. The drive device further has a compressor, which can be driven by the electric motor and can thus also be referred to as an electrically driven compressor.

The compressor serves for supplying the internal combustion engine with combustion fresh gas. For this purpose the compressor transports combustion fresh gas from the external environment in the direction of the internal combustion engine. The compressor compresses the combustion fresh gas flowing through it and supplies the combustion fresh gas to the internal combustion engine at a pressure level that is higher than the pressure level prevailing immediately upstream of the compressor. The combustion fresh gas can be present in the form of air, in particular fresh air. In the case of an exhaust gas return it may also contain exhaust gas. The electrically driven compressor serves in particular for providing a higher torque at low rotational speeds, i.e., for increasing of the power of the internal combustion engine as fast as possible.

It would be desirable and advantageous to provide a method for operating a drive device, which enables a more comfortable driving behavior of the motor vehicle.

SUMMARY OF THE INVENTION

According to one aspect of the present invention a method for operating a drive device of a motor vehicle, includes providing a drive device having a compressor drivable by an electric motor for supplying combustion fresh gas to an internal combustion engine of the motor vehicle; and at a power increase of the internal combustion engine driving the compressor with the electric motor so that a torque curve selected from a plurality of different torque curves is established at the internal combustion engine over a rotational speed of the internal combustion engine.

The term power increase of the internal combustion engine means an increase of the torque provided by the internal combustion engine and/or its rotational speed. When the power is to be increased, for example due to a driver request based on which a set point torque is determined for the internal combustion engine, it can be provided to drive the compressor in order to increase the amount of combustion fresh gas supplied to the internal combustion engine and correspondingly increase the speed of the power increase.

When only a single torque curve is stored this torque curve usually corresponds to a maximal power increase of the internal combustion engine. In this way a high torque can be provided by the internal combustion engine already at low rotational speeds. However such a behavior is not always desired, for example when the motor vehicle is moved at low speeds or frequently has to be accelerated from standstill or low speeds to a slightly higher speed. Operating the compressor in this case for achieving the maximal power increase of the internal combustion engine may result in a jerky driving behavior, which passengers of the motor vehicle may perceive as uncomfortable.

For this reason the multiple different torque curves are stored from which a torque curve is selected. Each of the torque curves describes a torque curve of the internal combustion engine over its rotational speed, i.e., a torque envelope curve which defines for each rotational speed the corresponding maximally achievable torque of the internal combustion engine. Different torque curves can be stored for a large variety of different driving situations and the appropriate torque curve can be selected from the stored torque curves. Based on the selected torque curve the torque permissible for the present actual rotational speed of the internal combustion engine is determined and—when the requested torque is greater than the permissible torque—set at the internal combustion engine or the compressor is driven so that the torque is reached.

In other words a torque curve of the internal combustion engine over its rotational speed is selected from multiple different torque curves, in particular a torque curve that corresponds to a torque envelope curve. When the power of the internal combustion engine is increased or is to be increased, a set point torque is determined and the set point torque is limited to a torque that results for the actual torque of the internal combustion engine from the selected torque curve. Subsequently the compressor is driven so that the now limited set point torque is accomplished. In particular, for this purpose the limited set point torque is set at the internal combustion engine and in addition the compressor is driven correspondingly. The selected torque curve is correspondingly used for a limiting the power increase of the internal combustion engine or for limiting the torque provided or providable by the internal combustion engine.

According to another advantageous feature of the invention, one of the torque curves corresponds to a maximal power increase. This torque curve thus makes it possible to obtain the maximal power of the internal combustion engine at each rotational speed. This makes it possible to realize a sporty driving.

According to another advantageous feature of the invention, at least one of the torque curves, in particular all torque curves, have a constant torque increase gradient up to a maximal torque. The maximal torque describes the torque of the internal combustion engine that can be maximally provided by the internal combustion engine over all rotational speeds. Usually the torque curve or torque curves of the internal combustion engine increases/increase starting from a low torque at low rotational speeds up to the maximal torque, which is achieved at higher rotational speeds. Subsequently the achievable toque decreases again starting from the maximal torque in the direction of still higher rotational speeds. At least one of the torque curves or all torque curves may have the constant torque increase gradient, either only in the direction of the maximal torque or even until the maximal torque is reached. The term torque increase gradient means the gradient of the torque that can be maximally achieved at the respective rotational speed over the rotational speed. The constant torque increase gradient usually is present between a lower first rotational speed and a higher second rotational speed, wherein at the second rotational speed the torque that can be achieved at the second rotational speed can correspond to the maximal torque. The first lower rotational speed preferably corresponds to an idle speed of the internal combustion engine.

According to another advantageous feature of the invention, at least one of the torque curves, in particular all torque curves, have a torque increase gradient, which increases or decreases in the direction of higher torques. Correspondingly the torque curve can be adjusted particularly well to the respective driving situation. For example the torque increase gradient continuously decreases in the direction of higher torques or higher rotational speeds so that for example a softer approach to the maximal torque is achieved. On the other hand when the torque increase gradient increases in the direction of higher torques or higher rotational speeds it can be provided that at lower rotational speeds first a small power increase of the internal combustion engine is permitted, and on the other hand at higher torques or rotational speeds a stronger power increase, in particular a maximal power increase.

According to another advantageous feature of the invention, the compressor is solely driven by means of the electric motor. Generally it is conceivable that the compressor is a component of the exhaust gas turbocharger, which can be additionally driven by means of the electric motor. However, the compressor is preferably the only compressor of the internal combustion engine so that besides the compressor no exhaust gas turbocharger or is provided in addition to such a exhaust gas turbocharger or even multiple exhaust gas turbochargers. In each of these cases the compressor can be exclusively driven by means of the electric motor.

According to another advantageous feature of the invention, the torque curve can be selected by a driver of the motor vehicle from multiple torque curves by means of a setting device. The setting device is for example an operating element, which is arranged within reach of the driver of the motor vehicle. Such an operating element may for example be a button, a switch or the like. Of course also a touch screen or similar electronic input devices can be used as operating element.

In addition or as an alternative it can of course also be provided that the torque curve is selected from multiple torque curves by a driver assistance device, in particular in dependence on an actual driving situation of the motor vehicle. Preferably the driver assistance device recognizes the driving situation or selects an appropriate driving situation from multiple different driving situations. The recognition of the actual driving situation can for example be determined by way of a course of the driving speed of the motor vehicle, a steering angle and/or similar state variables of the motor vehicle.

According to another advantageous feature of the invention, the torque curve is selected by way of an identification feature assigned to the driver. Particularly preferably different drivers of the motor vehicle are assigned different identification features. This identification feature can for example be an ignition key or an electronic mobile part, for example a mobile phone. Identification features present in the vicinity of the motor vehicle are detected and when an identification feature is detected conclusions regarding the driver are drawn. When a torque curve is assigned to the driver, this torque curve is selected and is thus preset. When the driver subsequently selects a different torque curve this torque curve can be stored as a default setting for the driver so that after turning off the motor vehicle and a renewed start of the motor vehicle and recognition of the identification feature assigned to the driver the last set torque curve is used.

According to another advantageous feature of the invention, the compressor is only driven by the electric motor for setting the torque curve when the power increase exceeds a threshold value. For example the electrically driven compressor is not required when a power is increased to a degree at which the torque to be produced by the internal combustion engine, i.e., the set point torque, is smaller or significantly smaller than the torque which results for the actual rotational speed from the selected torque curve. Usually the electrically driven compressor is only used for providing the combustion fresh gas when the power increase exceeds the threshold value, for example when the set point torque is greater than or equal to the torque that results for the actual rotational speed for the selected torque curve.

According to another advantageous feature of the invention, when the power increase of the internal combustion engine falls below the threshold value, combustion fresh gas to be supplied by an exhaust gas turbocharger is conducted so as to bypass the compressor by means of a bypass device. Besides the electrically driven compressor the at least one exhaust gas turbocharger is present. The exhaust gas turbocharger is arranged upstream of the compressor so that the compressor is fluidly situated between the exhaust gas turbocharger and the internal combustion engine.

At low rotational speeds the exhaust gas mass flow provided by the internal combustion engine is not sufficient to accelerate the exhaust gas turbocharger sufficiently fast in order to perform the desired power increase. Thus in this case the electrically driven compressor is operated. This is in particular the case when the power increase reaches or exceeds the threshold value. On the other hand when the power increase falls below the threshold value, i.e., the power increase is smaller than the threshold value, the electrically driven compressor is not needed. Rather the power increase can be performed solely by means of the at least one exhaust gas turbocharger. In order to be able to deactivate the electrically driven compressor the combustion fresh gas is therefore conducted so as to bypass the compressor by means of the bypass device, i.e., it is supplied by the exhaust gas turbocharger to the internal combustion engine by circumventing the compressor.

According to another aspect of the invention A drive device for a motor vehicle, includes an internal combustion engine; an electric motor; and a compressor drivable with the electric motor for supplying combustion fresh gas to the internal combustion engine, wherein the drive device is configured to drive the compressor with the electric motor at a power increase of the internal combustion engine so that a torque curve selected from a plurality of different torque curves is established at the internal combustion engine over its rotational speed.

BRIEF DESCRIPTION OF THE DRAWING

Other features and advantages of the present invention will be more readily apparent upon reading the following description of currently preferred exemplified embodiments of the invention with reference to the accompanying drawings, in which.

DETAILED DESCRIPTION OF PREFERRED EMBODIMENTS

Figure 1:
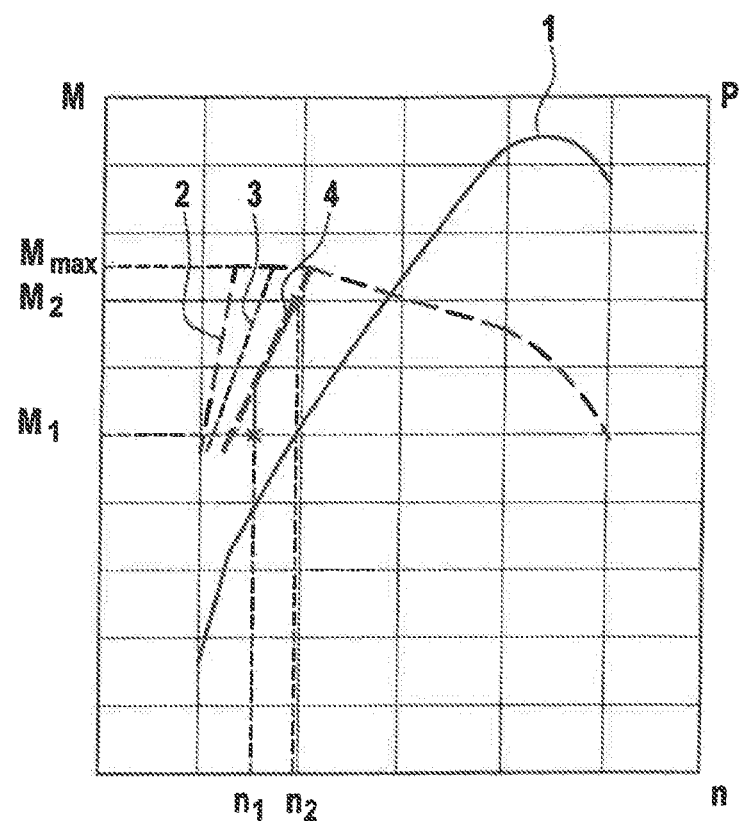
FIG. 1 shows a diagram in which a torque and a power of an internal combustion engine are plotted over its rotational speed.

FIG. 1 shows a diagram in which a torque M of an internal combustion engine and its power P are plotted over its rotational speed n. A curve 1 describes hereby the power P over the rotational speed, while the reference numerals 2, 3, and 4 designate different torque curves. The internal combustion engine is a component of a drive device, which also has an electrically driven compressor. Assigned to the compressor is an electric motor by means of which the compressor can be driven for supplying combustion fresh gas to the internal combustion engine.

The compressor is driven by the electric motor in the case of a power increase of the internal combustion engine so that a torque curve of the internal combustion engine selected from the multiple different torque curves 2, 3, and 4 in FIG. 1 is established over the rotational speed n of the internal combustion engine. In the here shown exemplary embodiment in FIG. 1, curve 2 describes a torque curve, which corresponds to a maximal power increase. Curve 3 shows a torque curve with a slower power increase than curve 2, and curve 4 shows a torque curve with a slower power increase than curve 3.

Each of the shown torque curves 2, 3, and 4 in FIG. 1 however reaches a maximal torque $M_{max}$ at different rotational speeds. Thus, curve 3 reaches the maximal torque $M_{max}$ at a higher rotational speed than curve 2, and curve 4 at a higher rotational speed than curve 3. However, it can also be provided that at least one of the torque curves 2, 3, and 4 does not reach the maximal torque but only reaches the maximal torque at a rotational speed which is greater than the greatest rotational speed for which the maximal torque can be reached by the internal combustion engine. In this case, the torque that is maximally achievable in the corresponding torque curve is smaller than the maximal torque.

Figure 2:
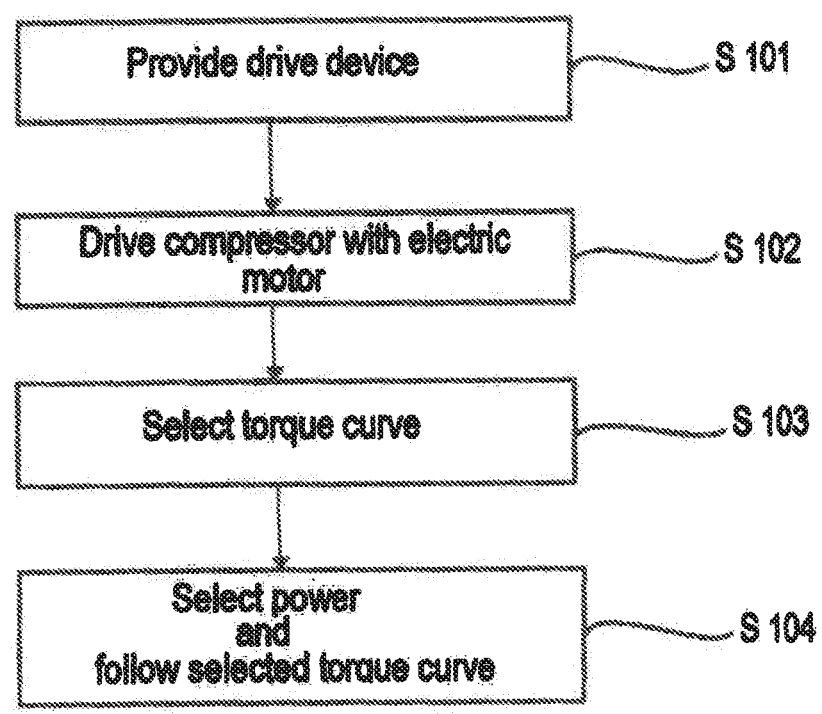
FIG. 2 shows the method according to the present invention.

During operation of the drive device in steps S101 and S102 according to the method of the present invention as shown in FIG. 2, the torque curve to be used is selected from multiple torque curves 2, 3, and 4 in step S103. In the here shown exemplary embodiment shown in FIG. 1, torque curve 4 is selected. At a first time point the torque M provided by the internal combustion engine is M=M1, while for the actual rotational speed of the internal combustion engine the relationship n=n1 applies. In the following step S104, a power increase of the internal combustion engine is to be performed, i.e., by increasing the torque M to the torque M=M2. However, this cannot be accomplished for the rotational speed n=n1 so that the torque M and the rotational speed n are increased along the torque curve 4 in order to reach the torque M=M2 as part of step S014. It can be seen in FIG. 1 that the power increase is hereby limited by the torque curve 4 compared to one of the other torque curves 2 and 3. This is preferably accomplished so that a constant torque increase gradient up to the torque M=M2 is realized.

With the described method or the described drive device different torque curves, corresponding to the momentary driving situation of a motor vehicle, can be selected. In this way a driving comfort of the motor vehicle can be significantly improved because jerky accelerations of the motor vehicle can be avoided by corresponding selection of the torque curve from the different torque curves.

What is claimed as new and desired to be protected by Letters Patent is set forth in the appended claims and includes equivalents of the elements recited therein:

1. A method for operating a drive device of a motor vehicle, said method comprising:
   providing the drive device having a compressor drivable by an electric motor for supplying combustion fresh gas to an internal combustion engine of the motor vehicle;
   driving the compressor with the electric motor;
   selecting a torque curve from a plurality of different torque curves stored for a variety of different driving situations using a setting device in the motor vehicle and/or an identification feature assigned to a driver of the motor vehicle;
   during a subsequent power increase of the internal combustion engine, determining and limiting a setpoint torque to a torque resulting from the selected torque curve for an actual rotational speed of the internal combustion engine,
   wherein during said subsequent power increase, the compressor is driven by the electric motor,
   wherein at least one of the plurality if different torque curves has a constant torque increase gradient up to a maximal torque of the internal combustion engine, wherein the maximal torque is a largest torque of the internal combustion engine that can be provided by the internal combustion engine at each rotational speed.

2. The method of claim 1, wherein one of the plurality of different torque curves corresponds to a stronger power increase of the internal combustion engine in relation to another of the plurality of different torque curves.

3. The method of claim 1, wherein all of the plurality of different torque curves have a constant torque increase gradient up to a maximal torque of the internal combustion engine.

4. The method of claim 1, wherein at least one of the plurality of different torque curves has a torque increase gradient which decreases or increases in a direction of higher torques.

5. The method of claim 4, wherein all of the plurality of different torque curves have a torque increase gradient which decreases or increases in a direction of higher torques.

6. The method of claim 1, further comprising driving the compressor solely by means of the electric motor.

7. The method of claim 1, further comprising only driving the compressor with the electric motor when the power increase exceeds a threshold value.

8. The method of claim 1, further comprising conducting with a bypass device fresh gas to be provided by an exhaust gas turbocharger so that the fresh gas circumvents the compressor when the power increase of the internal combustion engine falls below the threshold value.

9. A drive device for a motor vehicle, comprising:
   an internal combustion engine;
   an electric motor; and
   a compressor drivable with the electric motor for supplying combustion fresh gas to the internal combustion engine, said drive device being configured to drive the compressor by means of the electric motor,
   wherein a torque curve stored for a variety of different driving situations is selected from a plurality of different torque curves using a setting device in the motor vehicle and/or an identification feature assigned to a driver of the motor vehicle, wherein during a subsequent power increase of the internal combustion engine, a setpoint torque is determined and limited to a torque resulting from the selected torque curve for an actual rotational speed of the internal combustion engine, wherein during said subsequent power increase, the compressor is driven by the electric motor, wherein at least one of the plurality of different torque curves has a constant torque increase gradient up to a maximal torque of the internal combustion engine, wherein the maximal torque is a largest torque of the internal combustion engine that can be provided by the internal combustion engine at each rotational speed.

* * * * *